US011126960B2

(12) United States Patent
Mahajan et al.

(10) Patent No.: US 11,126,960 B2
(45) Date of Patent: Sep. 21, 2021

(54) INTELLIGENT DISPOSITION OF RETURNED ASSETS

(71) Applicant: Phoenix Innovations, LLC, Alpharetta, GA (US)

(72) Inventors: Amit Anil Mahajan, Cumming, GA (US); Ameya Kandalkar, Pune (IN); Deepak Khemani, Cumming, GA (US); Kaustubh Narendra Karnik, Pune (IN); Yogesh Murlidhar Chaudhary, Pune (IN)

(73) Assignee: Phoenix Innovations LLC, Alpharetta, GA (US)

( * ) Notice: Subject to any disclaimer, the term of this patent is extended or adjusted under 35 U.S.C. 154(b) by 72 days.

(21) Appl. No.: 16/659,882

(22) Filed: Oct. 22, 2019

(65) Prior Publication Data
US 2020/0126027 A1 Apr. 23, 2020

Related U.S. Application Data

(60) Provisional application No. 62/748,598, filed on Oct. 22, 2018, provisional application No. 62/859,667, filed on Jun. 10, 2019.

(51) Int. Cl.
*G06Q 10/08* (2012.01)
*G06Q 40/06* (2012.01)
(Continued)

(52) U.S. Cl.
CPC .......... *G06Q 10/087* (2013.01); *G06Q 10/06* (2013.01); *G06Q 10/10* (2013.01); *G06Q 40/04* (2013.01);
(Continued)

(58) Field of Classification Search
CPC ...... G06Q 10/087; G06Q 10/06; G06Q 10/10; G06Q 40/04
See application file for complete search history.

(56) References Cited

U.S. PATENT DOCUMENTS

| 8,447,664 B1 * | 5/2013 | Pape | G06Q 10/087 705/28 |
| 2004/0193438 A1 * | 9/2004 | Stashluk, Jr. | G06Q 30/016 705/304 |

(Continued)

*Primary Examiner* — Vanel Frenel
(74) *Attorney, Agent, or Firm* — Lynn Marie Holly

(57) ABSTRACT

Embodiments are directed to systems, methods and computer program products for dispositioning returned assets. Embodiments determine, for each asset, the optimal disposition, prepare the asset for its final disposition, label it, and direct it to the appropriate landing bucket. Some embodiments receive an asset, connect it to a hub where it may be activated and received into a warehouse. The asset may require diagnostics to determine operational/functional and cosmetic status and/or other services to prepare it for final disposition. Data may be collected from the asset, the receiving process and a database containing information related to the asset item number and the record for the specific asset. An asset profile is created to which business rules are applied which may determine a preliminary disposition for the asset. Profiles for assets passing preliminarily dispositioning are processed through an optimal value server. The optimal value server determines the optimal disposition of an item based on demand and cost. Items are labeled for final disposition and directed to the appropriate bucket or bin for shipping.

11 Claims, 7 Drawing Sheets

(51) Int. Cl.
*G06Q 10/10* (2012.01)
*G06Q 40/04* (2012.01)
*G08B 13/24* (2006.01)
*G06Q 10/06* (2012.01)

(52) U.S. Cl.
CPC ......... *G06Q 40/06* (2013.01); *G08B 13/2462* (2013.01)

(56) References Cited

U.S. PATENT DOCUMENTS

2013/0339922 A1* 12/2013 Sproule ................ G06Q 10/063
717/103
2014/0122524 A1* 5/2014 Bennett ............. G06F 16/24564
707/769
2016/0232546 A1* 8/2016 Ranft .................. G06Q 40/025

\* cited by examiner

INTELLIGENT DISPOSITION OF RETURNED ASSETS

CROSS-REFERENCE TO RELATED APPLICATIONS

This patent application claims the benefit of U.S. Provisional patent application No. 62/748,598, filed Oct. 22, 2018 entitled "REVERSE LOGISTICS ITEM DISPOSITION SYSTEM AND METHOD" and U.S. Provisional patent application No. 62/859,677, filed Jun. 10, 2019 entitled "INTELLIGENT DISPOSITION OF RETURNED ASSETS," both of which are incorporated herein by reference in their entirety and for all purposes. A claim of priority is made.

FIELD OF THE INVENTION

The presently disclosed technology relates generally to an improved data processing method and computer program product for intelligent dispositioning of returned assets. In particular, it relates to optimal dispositioning of returned assets.

BACKGROUND OF THE INVENTION

In the supply chain domain, reverse logistics is typically an afterthought. Sellers may receive returned items and place them back into the forward supply chain or salvage them. In such a basic system, some optimization may be available by moving a number of items from one end point to another in order to fulfill vendor requirements. However, in the world of high-tech electronics and easy consumer returns, reverse logistics can play a key role in unlocking the value of a returned item. Determining the optimal disposition of each individual, returned item can save the retailer millions of dollars each year.

Disposition of reverse logistics inventory has been largely a manual process, with receiving personnel making important disposition decisions based on a short list of very general criteria with no thought to value optimization. Even when automated, previous systems and methods could not provide an optimal-value, per-item disposition.

There is a need for a system and method that analyzes an individual item based on item, product and market/financial factors and directs the item to the appropriate disposition bucket.

SUMMARY OF THE INVENTION

Embodiments described in this disclosure address the above needs and achieve other advantages over the prior art by providing novel and non-obvious systems or apparatuses, methods and computer program products for real-time determination of the optimal disposition of a returned item. The disclosed subject matter is based on an inventory routing engine that provides users with the best value scenario based on multiple parameters that may be defined for the item, available markets, and business needs.

Embodiments disclosed herein determine the optimal disposition of an asset by determining criteria for the optional dispositional paths, analyzing and measuring item features and characteristics based on those criteria, determining market demand and pricing and determining the path providing the greatest benefit to the receiving organization. This may comprise identifying and authenticating an item at the point of receiving, creating an item profile of data related to that item and determining, based on the item profile and market data, the optimal disposition of the item. The item profile may include attributes such as those of the item itself (e.g. serial number), the type of product (e.g. make, model, item number), and any business requirements related to the item (e.g. eligibility for channel programs, sunsetting, etc.). As the item moves through the process it may be functionally and cosmetically evaluated with the results added to the item profile.

An optimal disposition engine may determine the availability of secondary markets for a particular item by applying dispositional business rules, inquiries and an algorithm to the item profile to determine demand availability and capability, determine and/or predict market prices, etc., and compare the identified options (which may also include retaining an item) to find an optimal value disposition.

The disclosed solution enables reverse logistics operations to determine the disposition of greatest value to the company at the point of receiving. This system, method and computer program product integrates with the logistics provider supply chain database or Enterprise Resource Planning system, industry specific diagnostic applications, if appropriate, item specific warranty and insurance records, and market portals to give an intelligent, market-value driven disposition of the returned item while updating enterprise and warehouse systems.

A preferred embodiment can be tailored and integrated with receiving processes across industries to maximize the value of a returned asset. Some of the features that are disclosed herein for an intelligent disposition for returned assets system, method and computer program product include (1) micro services-based architecture to plug in different data sources for evaluating the best disposition for a returned product; (2) business rule-driven routing that can evaluate multiple parameters, and collected data points; (3) pre-built industry specific services for warranty checks and cosmetic grading; (4) integration with returned product-specific special services, including integration with third-party supply chain partners, where required; (5) a research and analytics engine that aids in determining the root cause of an exception and learning over time to handle the exceptions automatically; (6) reports and analytics to provide key performance metrics for operational throughput, exceptions and disposition value (7) integration with market portals to provide real time forecast demand and pricing; and (8) final disposition of an item based on the optimized path for each particular item. A final disposition includes an item designated for transfer to a shipping or processing bucket or bin for the optimal disposition of the individual item or moving or shipping the item to an identified recipient.

Analytics-based determination of the disposition bucket is geared to provide the maximum value of an individual asset in the market or other channels as identified by the retailer based on business rules, the functional and aesthetic condition of the item and market demands. Highly graded product may be tagged for refurbishment sale and less desirable products tagged for scrap or liquidation. This process provides a higher value of product as the evaluation of the product is moved from a traditional fixed parameter sets to a dynamic analytics-based evaluation and a reduction in cost of operations of reverse logistics by consolidating the steps for triage, improving turn-around time and by reducing exceptions Previously, systems for dispositioning returned items provide only a rough approximation of an optimal disposition, while the system and method disclosed herein provides an optimal disposition of each individual item based on the condition of the item and the available markets and dispositional paths. The features, functions and advantages that have been discussed may be achieved independently in various embodiments of the present disclosure or may be combined with yet other embodiments, further details of which can be seen with reference to the following description and drawings.

DETAILED DESCRIPTION

Figure 1:
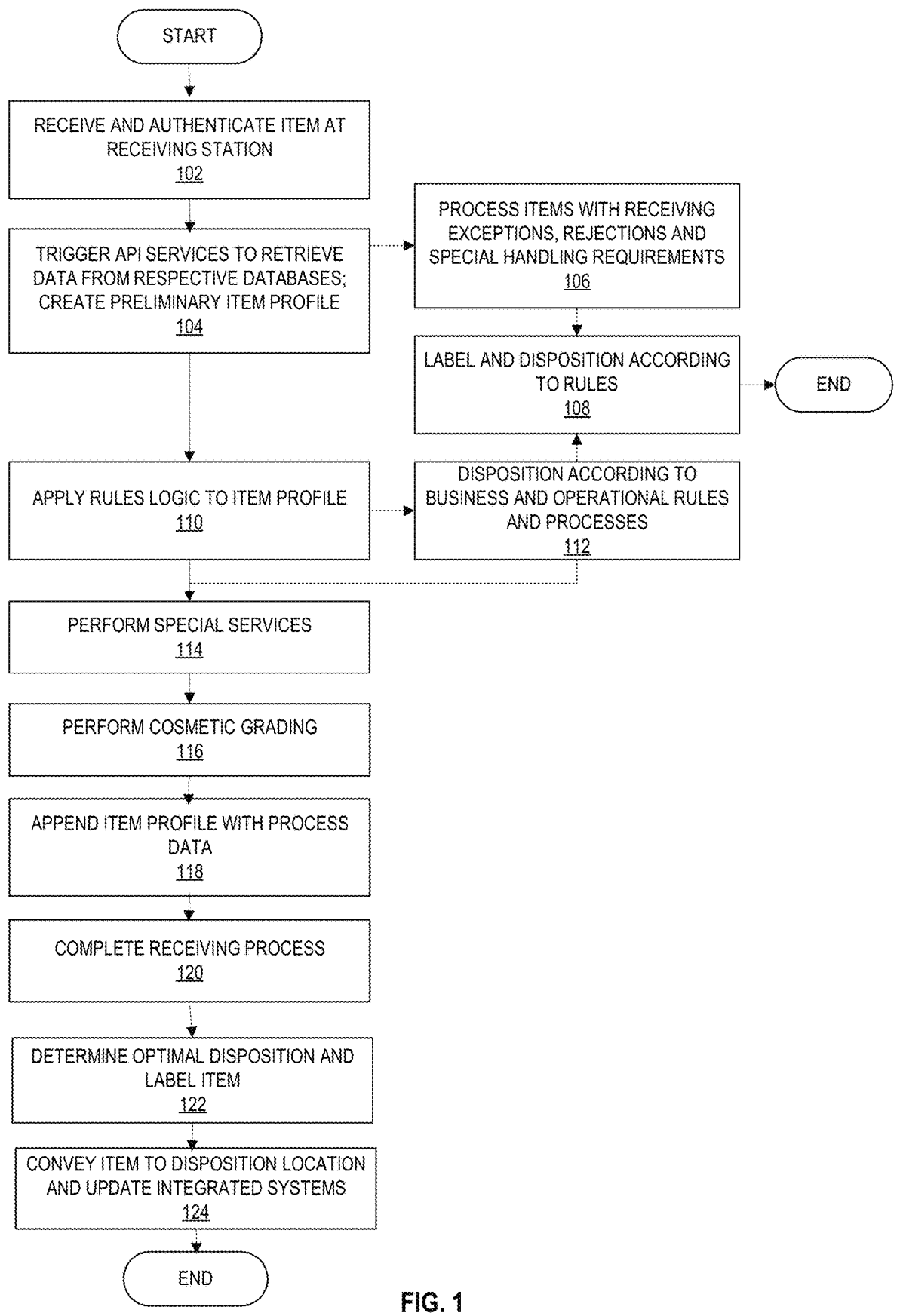
FIG. 1 depicts an illustration of the processes that may be involved in a preferred embodiment consistent with this disclosure.

Embodiments of the claimed subject matter will now be described more fully with reference to the accompanying drawings, in which some, but not all embodiments are shown. The subject matter disclosed may be embodied in many different forms and should not be construed as limited to the embodiments set forth herein; rather, these embodiments are provided so that the disclosure may satisfy legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." It should also be understood that while some embodiments describe the methods or products as comprising one or more elements, the methods or products may also consist of or consist essentially of the elements disclosed herein.

A "user" as used herein may refer to any entity or individual associated with use of the system or method as described herein. A user may be a seller of products or an employee of such a user, or it may refer to an independent processor providing services for a seller. An operator may refer to an individual receiving and processing an item. A "transaction" may refer to a sale, shipment, or receipt of an item under a return material (or merchandise) authorization (RMA). Previous sales, receipts or distributions are considered "historical transactions." A "module" is known to those of skill in the art as computer instructions which when executed by a processor direct the specific actions performed by the machine. An "item" refers to a particular piece processed according to this disclosure, while a "product" refers to a class or type of item. The words "item" and "device" may be used interchangeably when discussing an exemplary embodiment.

As used herein, a "user interface" generally includes a plurality of interface devices and/or software that allow a user to input data and commands to direct the processing device to execute instructions. For example, a user interface may include a graphical user interface (GUI) or an interface to input computer-executable instructions that direct the processing device to carry out specific function. A "system interface" allows two separate systems to meet, interact with and exchange data. Input and output devices may include a display, mouse, keyboard, button, touchpad, touch screen, microphone, speaker, LED, light, joystick, switch, and/or other user input/output device for communicating with one or more users. The end point of an optimal disposition path may be referred to as a "bucket" or "bin" reflecting the point of shipment or distribution of the item as it is moved to its final position in the supply chain. In this disclosure, a "secondary market" may not only include secondary sales, auction markets, refurbish/resale and other markets, but may also include in-house disposition of items, such as when a returned item is used as seedstock for forward sales or warranty programs with or without intermediate processing. In other words, a secondary market may be any sales or dispositional opportunity for a returned item. The end-to-end process of receiving an item and determining its optimal disposition path may be referred to as an "evaluation." The term "evaluating" may also be used to describe system processes comparing data stored as an item profile to data stored as rules or attributes of a disposition option, possibly performing calculations on such data, in order to determine the optimal disposition of an item.

Unless specifically stated otherwise in context, it may be appreciated that terms such as "processing", "detecting", "determining", "receiving", or the like may refer to the action and/or processes of a computer or computing system, or similar device that manipulates or transforms data represented as physical quantities within the computing system's registers, memories or other data storage into other data similarly represented within the computing system. The embodiments are not limited in this context.

Embodiments of the claimed subject matter are described herein in terms of transactions involving returned products; specifically, they involve the disposition of items spanning the reverse supply chain and forward supply chain for secondary markets. However, the system and methods described here are not limited to this purpose. Such a system and method has application to any context in which a large number of diverse items may be sorted into multiple dispositional categories based on the optimal benefit they provide to the seller.

A seller may have multiple dispositional paths for received items. Generally, criteria is set for dispositioning the items to a particular end point that may involve the seller's business requirements and products, including business/sales channel requirements, an item's life cycle, features, and operational and cosmetic status and more. Determination of the end point also requires a real-time knowledge of the dispositional end point, or secondary market, including availability and pricing forecasts, capacity, and additional costs that must be spent to improve the product, if necessary.

While the system and methods disclosed herein may be configured to support any type of product, they may be particularly useful where a product (1) requires authentication, (2) has access to a secondary market, and (3) may require an intermediate disposition, such as repair or refurbishment by a secondary processor or vendor partner, prior to entering the secondary market. The disclosed subject matter may be practiced in receiving locations such as a centralized warehouse, at a retail store, or at receiving station kiosks or vending machines. Receiving locations are typically interfaced for data extraction and updates with a warehouse management (WMS), enterprise resource planning (ERP) or point-of-sale (POS) system. The system and method may be entirely automated or may involve manual movement of an item from one sub-process or service to another. In some embodiments, some functions described herein as automated functions may be performed manually, and some manual functions may be performed automatically unless otherwise indicated.

Referring now to FIG. 1, a flow chart is provided, illustrating a computerized implementation of a method that may be utilized in a preferred embodiment consistent with this disclosure. One of ordinary skill in the art will recognize that receipt may comprise fewer or different sub-processes which may be performed in a different order while remaining consistent with the claimed subject matter.

Items received at a receiving station may be authenticated 102 to confirm that the item received is in fact the item described on the return material authorization as may be determined by serial number, make and model or other information, and that it was originally sold by the receiving seller. Additional authentication procedures may take place further in the receiving process. Upon authentication, communications may be initiated, such as via a set of application programming interfaces (APIs) 104 triggered to extract and collect data related to the item from data stores. Data may be extracted at the product, item and transaction level, as is illustrated by the examples in Table 1. Additional or other data related to each type may be extracted and appended to the profile depending on product requirements for determination of optimal value disposition.

TABLE 1

Example Data Extraction for Receiving and Initial Item Profile

| TYPE | EXAMPLES OF DATA ELEMENTS |
| --- | --- |
| Product | Product Number (SKU) |
|  | Standard Cost Data for Product in each category |
|  | (new, used, refurbished, etc) |
| Item | Serial Number |
|  | Date in service |
|  | Lost/stolen flag |
|  | Sales Channel |
| Transaction | RMA number |

An initial item profile is constructed with the data collected and may be appended with additional process results as the item proceeds through the evaluation sub-processes and services leading to final disposition. An item profile may be alternatively described as an item record or collection of data that comprises all the item attributes required to receive and disposition an item according to the business and operational rules, requirements and algorithms the system must use to determine the desired dispositional endpoints.

Referring again to FIG. 1, RMAs or items on RMAs identified as exceptions or requiring special handling requirements or rejections may be processed as exceptions, labeled with a printed label, infrared ink or similar marking, and dispositioned according to business or operational rules 106. Items that meet with exceptions throughout the process may be handled through exception processing. Exceptions may occur at any point in the evaluation process and may be RMA, product or item related. RMA related exceptions may include an RMA not found or one that contains discrepancies from expected data. Examples of item related exceptions include receipt of an item that has been reported lost or stolen or an item whose warranty status is "in-warranty." An exception may be labeled and processed through side- or sub-processes and may either be directly disposed of (given a final disposition) or sent back into the process line. If the first disposition is a final disposition, the item is labeled and directed to its endpoint 108. Rules logic may provide initial, gateway rules and restrictions for a first disposition 110, for example, if an item profile indicates that a warranty may be applicable rules logic directs the item profile to a warranty check module. If the item is under warranty, it is labeled and directed to a warranty final disposition with or without further processing. Items that receive a final disposition from the application of business rules and logic may be labeled and conveyed to their endpoint location 108; those that are not continue to an intermediate endpoint or other evaluation services. In some embodiments, rules may direct the item to an interim disposition, such as an operational service 114.

Operational services 114 are evaluation processes that may be applicable to a specific type of product. For example, diagnostic testing is an operational service, the details and particular implementation of which may be product dependent and may comprise testing to determine that the item functions are in working order. An item may be directed to a repair station for minor repairs discovered during diagnostic testing. Operational services may comprise additional processes or services that may be performed that are specific to a product, as will become apparent in the exemplary embodiment discussed below. An inspection and cosmetic grading process 116 may evaluate the physical condition of the item for damage, defects and imperfections that might reduce its value. Results of these processes and services are collected and are added to the item profile 118. As the receiving process is completed 120, integrated systems, such as WMS, ERP or POS, may be updated 124.

Items that haven't been finally disposed as the result of a service or sub-process, such as in-warranty items, or rejected items, complete all applicable services and sub-processes and are received into the receiving system (e.g. WMS, ERP or POS or similar system for receiving) 120 and may proceed to evaluation for final, optimal disposition 122. The optimal disposition 122 process comprises an evaluation of the item profile, the available disposition paths based on the item profile, the demand and pricing in secondary markets, business concerns (such as tax effects), and the demand, costs and capacity of secondary processing vendors defined for various disposition categories. The system may calculate the optimal value disposition for the item and finally direct or convey 124 the item to the appropriate location, bin, bucket or tote for disposition shipment.

Figure 2:
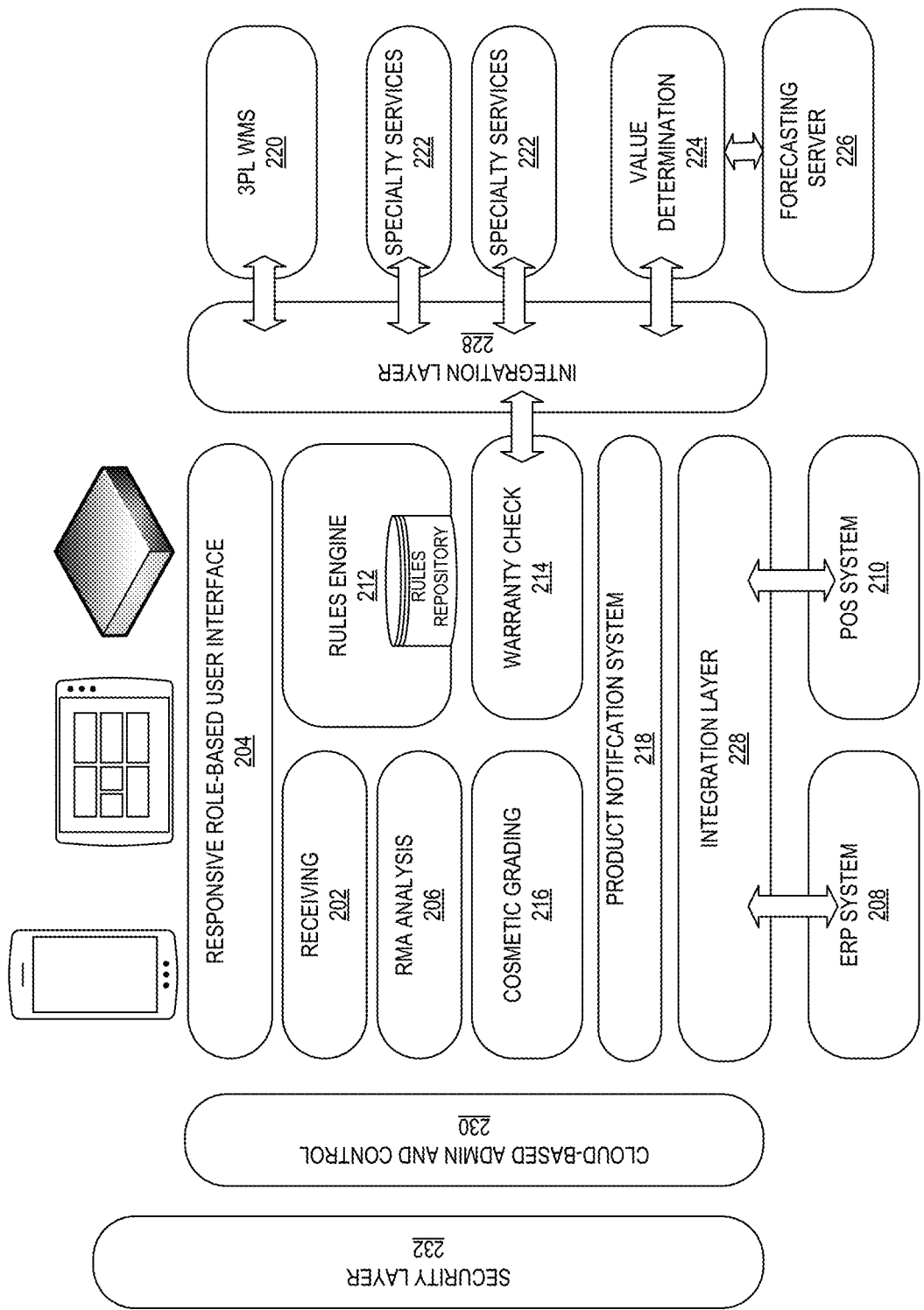
FIG. 2 illustrates an exemplary software architecture for a system in accordance with this disclosure.

FIG. 2 illustrates an exemplary system consistent with this disclosure. In some embodiments, the system may be a complex, highly distributed and highly integrated embodiment of the disclosed subject matter, comprising memory, processor and computer executable instructions stored in memory which, when executed by the processor, cause the system to perform the functions described by each module. Modules are described below at a high level.

Items returned by purchasers may be received at a warehouse, retail store, through a kiosk or similar receiving station 202. The receiving process may be broken down in various steps 202 with the sub-stations manned with operators each of whom process the items with a single service. Alternatively, a receiving station 202 may be available which performs a substantial number of services in place, with items conveyed when required. Items may be conveyed along receiving sub-stations 202 for performance of services. Each item receiving station 202 may be equipped with a terminal or computing device with access to a network. Operators may access a role-based user interface 204 allowing performance of different receiving functions according to function, and view dashboards related to management of the system.

An RMA analysis module 206 allows a user to access records related to a return, such as the RMA against which the item will be received and details regarding the transaction. The user may also conduct research on the item or an RMA. Generally, RMA information may be extracted by API or other data communication method, from an integration with a WMS, ERP 208, POS 210 or kiosk system in which the transaction was initiated. The item's entire history may be extracted and viewed when an item is serialized or is otherwise identifiable in the system.

Rules logic 212 and repository provide business rules and data that drive the gateway (i.e. a dispositional path based on business rules or needs) or further disposition of an item. Rules may be based on the business and operational requirements of a logistics organization. In an embodiment, an organization may have a plurality of sales channels running a plurality of programs with rules under which a product may be sold and returned. The product itself may have restrictions, for example, a model that is obsolete or is no longer in demand may take a different dispositional path than a current model. Similarly, an individual item may have rules attached to it based on various attributes. Rules may be complex and have one or more dependencies that determine an item disposition. A rule logic module 212 with memory and processor may apply rules at multiple layers of business and operational levels, for example the channel, program, product, item and transactional data levels. An item profile stored in a system database may be evaluated for applicable rules at any time during the process.

A warranty module 214 provides disposition according to original equipment manufacturers (OEM) or secondary rebuild or redistribution vendor warranties and/or supplier's policies. Rule logic and eligibility requirements may direct an item to the warranty module 214 for processing. Rules regarding warranty disposition may be complex; an item eligible for warranty may not be directed back to the warrantor if other rules take precedence. An exemplary warranty process is described in the exemplary embodiment below.

An inspection and cosmetic grading 216 sub-system may determine the physical/cosmetic state of an item and contribute to the item value determination for a secondary market. For example, cloth rips and tears, broken zippers, stains and missing notions on an item of apparel, or scratches and dents on a television screen greatly reduce the options for high value disposition. In addition to value determination, these attributes determine what kind of secondary processing may be required in order for the item to be resold in a particular secondary market. For example, cosmetic grading may detect shallow scratches that may be removed prior to sending an item down a particular dispositional path. Or, it may detect deep scratches that are impossible to repair without a complete screen replacement. Cosmetic grading typically requires a machine built and configured for the type of item being evaluated, the components of which are described more fully in the exemplary embodiment below.

A product notification 218 system may be utilized for communications regarding the receiving process. As items are dispositioned, a label is printed and attached to the product and the product is directed to the appropriate intermediate or endpoint disposition bin or bucket.

As was described above, the system may be integrated with an enterprise resource planning system (ERP) 208 and/or a point of sale (POS) 210 or kiosk system which initiate sales and return transactions or are otherwise interfaced with the intelligent disposition system. In addition, the system may be integrated with a warehouse management system (WMS) 220, which may be both the source of data and the target of updates when the item receiving process is complete.

Specialty services modules 222 comprise computer-executable instructions stored in memory, which, when executed by the processor directs the computer to perform any special services required for an item in order to determine its optimal dispositional value. Special services are generally product dependent, as will be discussed in the example below, and may generally be used to test the functional operation of the item or perform a service required for a particular product. As the items move through special services, results of each service are added to the item profile.

Finally, item profiles are processed through a value determination 224 module which determines the optimal disposition for the item. As was discussed above and will be illustrated below, optimal value disposition of an item includes the collection of secondary market data, including pricing and demand forecasting, which must be collected and used in an optimal value algorithm in real- or near real-time in order to realize the determined value. Items not requiring exception processing are ideally moved through the warehouse processes quickly, with receiving on one end and final, optimal disposition on the other.

As the optimal disposition is determined, a label may be printed or marked with infrared ink, with item details and a physical location for disposition (for example, a number or location of a shipping tote for salvaged items) and affixed to the item. The item may then be physically conveyed to the appropriate location. The value determination module 224 may be operatively connected to a forecasting server 226 for determining the optimal value disposition of an item. Data inputs into the forecasting server are illustrated more fully in the exemplary embodiment of FIG. 6. This server requires a network of communication devices and integration with vendors, market portals and business systems.

The disclosed subject matter could be implemented within a networked environment (e.g. the Internet, a wide area network (WAN), a local area network (LAN), a virtual private network (VPN), etc), a cloud computing environment, or a standalone computing system. Communications throughout the network can occur via any combination of various types of communication links or connection using wired or wireless transmission methods. Integration layers 228 provide communications between systems and services. Communications I/O application programming interfaces (API) may be SOAP, REST or other API services. When provisioned as a cloud-based Software-as-a-Service offering, the system may use cloud-based administration and control features 230 and a security layer 232.

An Exemplary Embodiment

The receipt and disposition of mobile devices provide the context for embodiments of the disclosed subject matter. As used herein, the term "mobile device" may refer to mobile phones, personal computing devices, tablet computers, wearable devices and/or any portable electronic device capable of receiving and/or storing data thereon. While the claimed subject matter is described here as the optimal disposition of mobile devices, the technology disclosed may be easily transferable to any type of product by reconfiguration to meet product specifications, forward and reverse logistics processing rules, vendor availability and capacity, and secondary market demand and pricing considerations. As used herein, the term "vendor" refers to a supplier or repair service that may prepare an item for further forward logistics. Communications with vendors regarding availability, capacity and costs may be on a batch or API level. The technology described herein enables the lifecycle of the return and efficient disposition while deriving the best possible value for the seller.

Mobile devices have a number of attributes that demonstrate the value and utility of the disclosed system and method. Both local and global secondary markets exist for mobile devices. There are rules and restrictions that may be used to determine a gateway disposition e.g. the item may be so heavily damaged that it is automatically scrapped; or erasure of personal information of the previous owner fails so the item must be scrapped. For items passing through the gateway restrictions there may be multiple final disposition categories available, depending on the functional and cosmetic condition of an item. Mobile devices are serialized items, assigned to a particular individual and connected with services, such as cellular or WIFI/internet services. A returned device may have private data and the original owner's identifying information in memory. The device may have a warranty attached and may involve complicated testing and diagnostics procedures in order to determine optimal value. Therefore, they are products which can and must be authenticated as well as sanitized and detached from mobile networks and subscription services before being dispositioned to one of several secondary market channels.

The embodiments disclosed herein perform a value-based process to identify and direct the optimal disposition of new or used items. Devices (i.e. items) may be dispositioned along multiple categories, for example, an item may go to (1) a forward channel, such as an insurance channel or re-shelved for resale as-is, (2) auction (may be sold to resellers as is or with minor repairs), (3) remanufacture (may be repaired by an outside vendor and resold), (4) refurbish (minor cosmetic improvements required by an outside vendor) or (5) salvage (scrapped), and more. Intermediate dispositional categories may also be included for adjustments that may be made in a receiving warehouse, such as repair for minor repairs or buff and polish for removing light scratches or other defects. Categories may be identified according to product, receiving and market needs.

In an exemplary embodiment, a rules logic module and repository 212 comprises business and operational rules related to the process steps required for receiving a mobile device into inventory with the goal of recognizing its maximum value disposition. Example gateway dispositions for a mobile device may include: rejection when a device is returned locked and must be returned to the sender; disposition requirements that are set by the original selling channel; disposition rules based on item details, such as obsolete SKUs that may be required to be sent to auction regardless of its functional status or physical condition; rules that override warranties, and more. Rules may be set for any kind of business or operational requirements. Rule complexity may range from very simple standalone rules to very complex rules with multiple dependencies.

Figure 3:
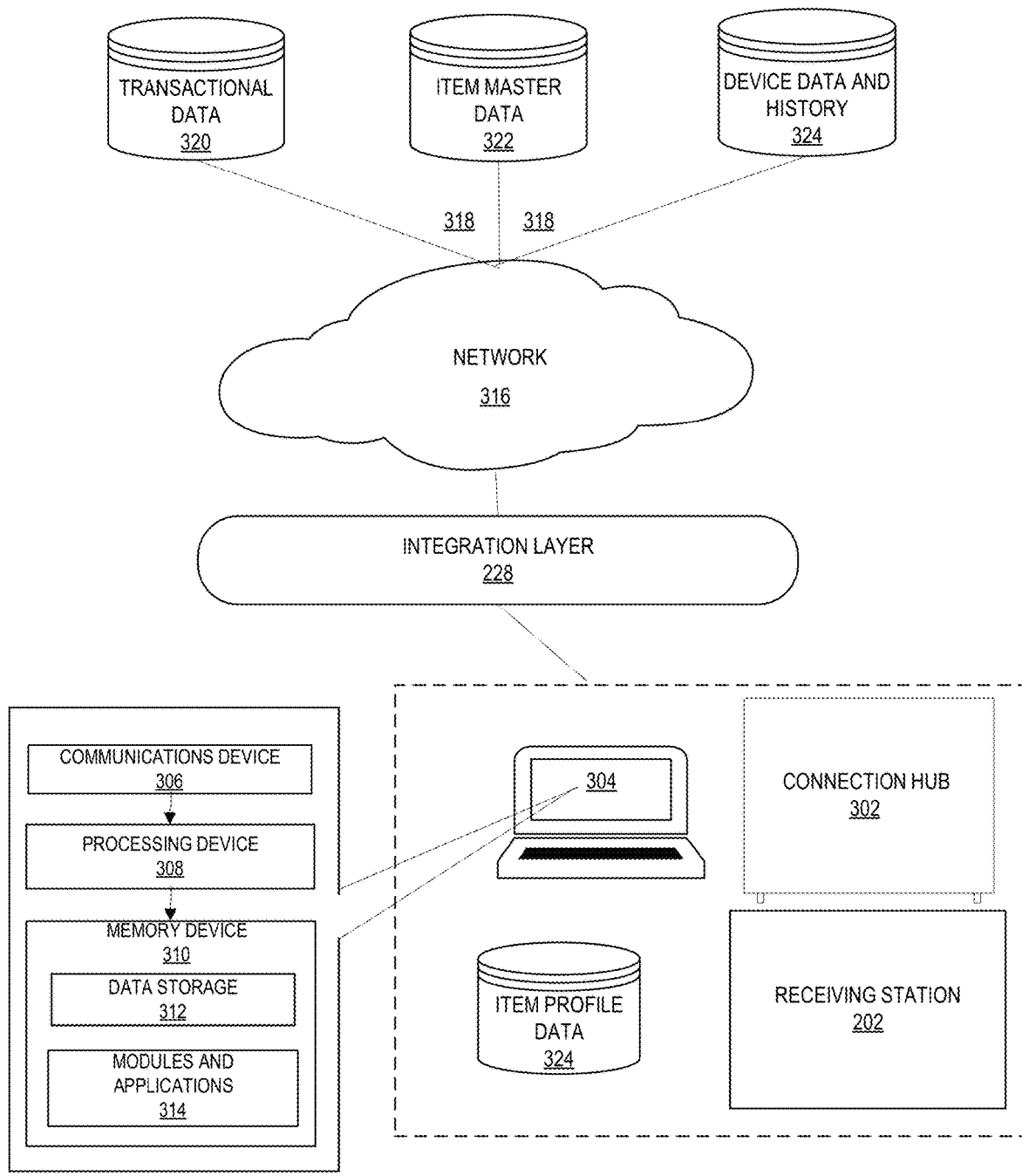
FIG. 3 provides an illustration of exemplary systems used in receiving an item and creating a preliminary item profile in accordance with this disclosure.

FIG. 3 illustrates the receiving process of mobile devices consistent with this disclosure. A physical receiving station 202 may include an apparatus that allows the user to evaluate a device, including a connection hub 302 for making network and power connections, a computing device 304 with processor 308 and memory 310 with data storage 312 and modules and applications 314 stored in memory, which when executed by the processor communicate with various modules 314 and external systems to perform receiving and evaluation functions. One or more mobile devices may be attached to a receiving station connection hub 302 for processing. Upon powering on, identifying data, such as an IMEI (serial number) for a mobile phone, may be automatically retrieved from the device, or, alternatively, may be scanned or entered into the system by an operator. Receipt of the identifying data triggers communication services 318 to retrieve transactional data 320 (e.g. customer data, expected item identifier, Return material authorization, etc.), item data 322 (e.g. item SKU, standard costs, kitting cost, available vendors, vendor demand etc.) and device data 324 (e.g. date of manufacture, date of activation, lost or stolen flag, locked flag, etc.) from their respective data stores. This data is captured in the system as a basic device profile. The profile will comprise the data required to receive and analyze an item, which may be used to determine the final disposition of the item along with the results of evaluation processes and services which will be discussed below.

Figure 4:
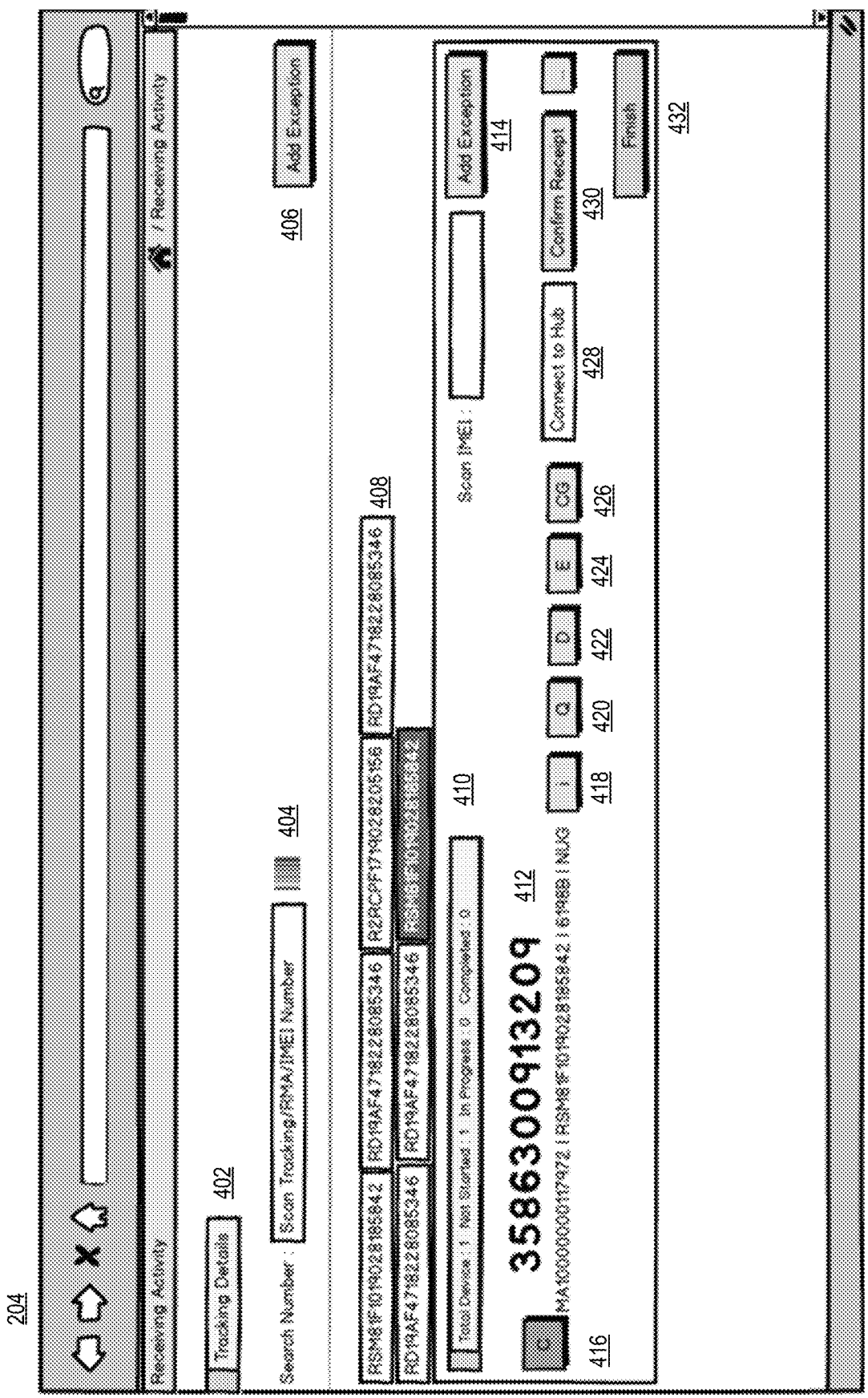
FIG. 4 illustrates an exemplary receiving screen provided by a preferred embodiment consistent with this disclosure.

FIG. 4 is a representation of an exemplary graphical user interface (GUI) receiving screen 400 accessible to a receiving operator, consistent with this disclosure. An exemplary screen may provide the collected data organized so the user may follow and interact with the receiving process as needed. The interface may comprise a tracking details section 402 with a search bar 404 allowing the user to search for an item by the RMA, serial number (in this case IMEI), or other tracking number. An exception button 406 may retrieve an exception screen where the user may report and process an exception related to RMA/tracking. An additional section 408 may show RMAs currently open at the station, highlighting the RMA in progress. Issues with receipt of a device against an RMA may require that the device be labeled and dispatched to an exceptions process 106. Issues requiring exception processing may include failure to locate an open RMA, finding a cancelled RMA, sales channel rules not supported, an RMA that is open for a different distribution center, RMA that has already been received against, and others. Exceptions may be handled by setting disposition to "exception," labeling the device as such, creating an exception transaction and sending the item to an exception location for resolution 108.

Another section 410 may display details related to the devices currently under evaluation at the station, including the number of devices not started, number in progress, and number completed at the station. If an item is not found in the system or otherwise requires exception processing, the user may add an exception 414 and confirm receipt 430. "Confirm receipt" 430 may be selected at any point in the process where the user is provided with an indication that the process should end (e.g. warranty status or other gateway dispositioning). The screen may provide information about the item 412 being processed and its status as it progresses through the evaluation process. Status indicators may show that the item, identified by its serial number (IMEI) 412 has been connected to the hub 416, 428. Further indicators provide notification that the user has received a pop-up screen with special instructions 418 if required, that the user has answered specific questions regarding the item 420, if required, that the item has passed diagnostics 422, data erasure 424 and/or cosmetic grading 426 and the results have been collected and added to the device profile. An additional status field may show the status or next steps required of the user 428. Once an item has completed processing the user may confirm receipt 430 and move on to the next item by selecting the "Finish" button 432. One of ordinary skill in the art will recognize that user interface screens are constructed to fit the process as required by the user, seller or merchant, the process and the product and that this exemplary screen is offered by way of example and not limitation.

An inspection and cosmetic grading module 216 may be manual, partially automated, or completely automated with a system and method described herein as a preferred embodiment, or one similar Nearly every item bound for a secondary market must be evaluated to determine the physical/cosmetic condition of the item. In a preferred embodiment, a cosmetic grading machine 216 is an automated device comprising a machine vision system (image capture and image processing) with the ability to identify, count and/or measure the number and configuration of defects such as scratches, breaks, etc., or other anomalies on any surface of the device and to distinguish defects from dust, reflection, and other artifacts. A preferred embodiment utilizes a cosmetic grading machine such as that described in U.S. patent application Ser. No. 16/445,620, titled INSPECTION AND COSMETIC GRADING THROUGH IMAGE PROCESSING which is incorporated herein by reference. The system may be configured to provide data allowing an intelligent disposition system and method to determine whether a pristine product may be returned to shelf or forward sales channel, determine whether the number and type of defects render it scrap material or that a replacement part will render it saleable and identify and determine what replacement parts may be required and what vendor may provide them. Results of inspection and cosmetic grading 216 processes are appended to the device profile and are used to determine the optimal dispositional value of the item. The system may provide a notification to a station or vendor that a particular item is in need of a particular replacement part and may be configured to place an order for that part so the item may be repaired in line prior to reaching the optimal disposition engine.

Figure 5:
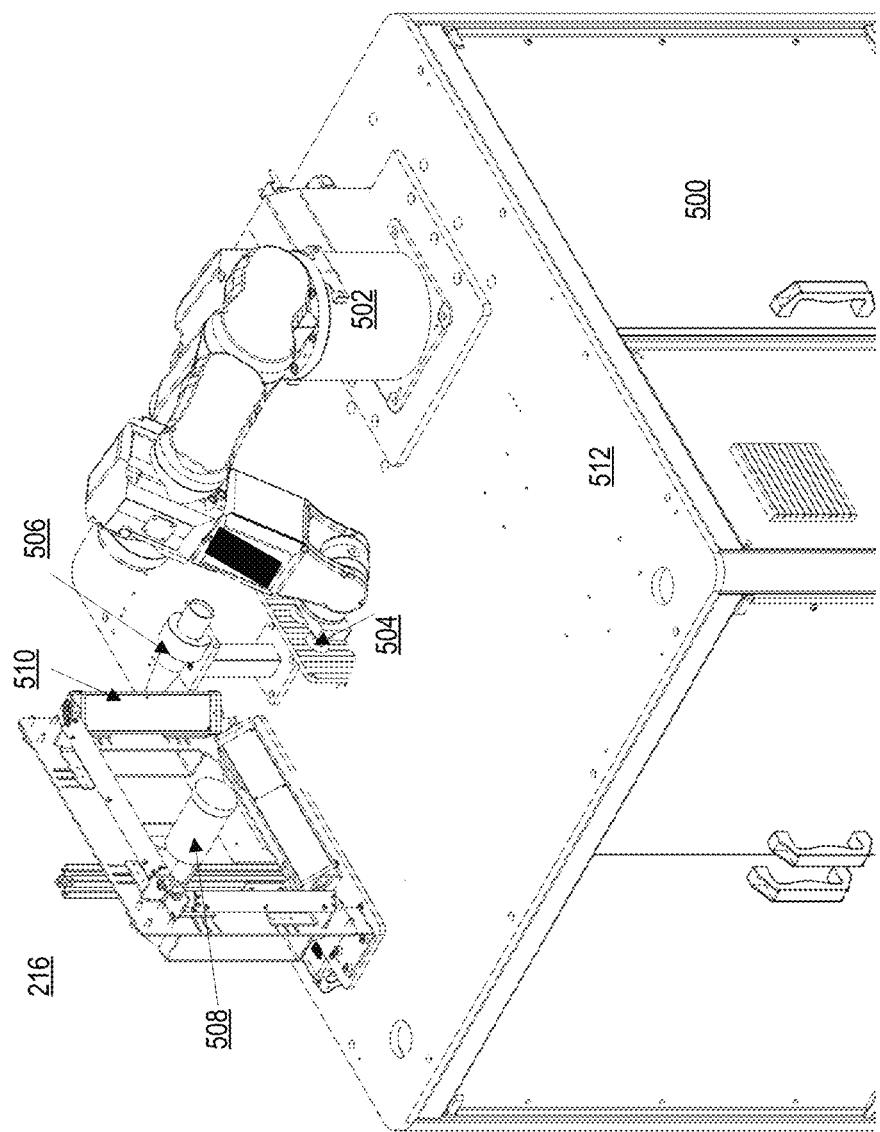
FIG. 5 illustrates a small-scale cosmetic grading machine consistent with a preferred embodiment for receiving small items.

In a preferred embodiment, an automatic inspection and cosmetic grading machine, such as is illustrated in FIG. 5 may be used. FIG. 5 is an exemplary device operatively configured to performing cosmetic grading of an item during the evaluation process. Such an inspection and cosmetic grading module may include a hardware image capture and defect measurement apparatus and software modules for image processing and cosmetic grading. Trained machine learning algorithms may be used to identify defects captured by the image processing module. Results of the inspection and cosmetic grading process may provide a full characterization of surface defects and a cosmetic grade according to pre-programmed cosmetic grading logic. Many industries, such as the mobile device industry, publish cosmetic grading criteria which define the number and type of defects that may be associated with a particular cosmetic grade. This classification system and criteria may be programmed into the machine to provide the standard grade associated with the condition determined by the cosmetic grading machine. Alternatively, the cosmetic grading machine may respond with a qualitative or quantitative response, such as the number of defects of a particular character that are present or whether replacement or buff and polish will remove the defects.

Further, the system and method may provide a suggested dispositional path based solely on the results of cosmetic grading (e.g. send to salvage, send for repair of screen, send for repair of casing, etc.) and/or notification that repair or refurbishment of a certain type, or a similar process is required. The results of the inspection and cosmetic grading process are appended to the device profile to be used to determine the final, optimal value disposition of the item.

Referring again to FIG. 5, the inspection and cosmetic grading 216 system's primary hardware components may reside within an enclosure 500 (the top of which is not shown here in order to view system components) designed to provide a barrier for the physical components, keep dust and debris off of the evaluation surface and provide an optimal image capture environment. Primary hardware components may comprise: an automated object handling control system (in this embodiment, a robotic arm 502) with mounting and gripping device 504, an advanced optical spot sensor 506, a plurality of cameras 508, and light assemblies 510 (light mountings, lights, light adjustment slide). A base plate 512 may provide a mounting area for the system components.

An automated object handling control system 502 may be equipped with various effectors and used for various purposes in an inspection and cosmetic grading system and method. For example, a system for processing small objects such as a mobile device may comprise a robotic arm 502 as automated object controller with vacuum or other effector suitable for attaching to, lifting, rotating and flipping the object, positioning the object in front of a light 510 and camera assembly 508 multiple times in order to get a complete image of all sides and angles of the device. Such a vision system provides image capture for a plurality of sides, angles and orientations under multiple exposure conditions.

An image processing module provides computer-executable instructions, which are stored in memory and executed by a processor to process the image. Image processing may include combining the images captured at all angles and positions into a single image, locating defects and determining defect properties including pixel light intensity, and determining the type and number of each. The single image allows calculation of defect coordinates with respect to the center of the mobile device. Defect detection, localization and auto-annotation may be performed using a machine learning (ML) algorithm trained on a large dataset of images with identifiable or identified defects. An image processing API and machine learning API generate real-time coordinates of the defect and measure the length and width of defects. Defect coordinates may be fed to the object handling X-Y stage motion controller, allowing the handling system to align the mobile device with an advanced optical spot sensor at each defect location. An advanced optical sensor and controller provide a depth measurement for each defect, and thus allows full characterization of each defect.

Cosmetic grading logic modules may comprise computer executable instructions stored in memory which when executed by a processor evaluate the cosmetic status of the item based on data collected from a cosmetic grading machine 216. Logic may comprise categories created for mobile devices that may depend on many factors, including the type of device, the presence of defects, number and/or type of defects or damage to the device, and the ability to repair the item or replace parts within a certain cost or capability range. The grading logic may also provide a suggested dispositional path for the object. CTIA™, an organization supporting the wireless industry, sets standards for wireless device grading scales which allow any seller in any secondary market to universally identify cosmetic condition and other graded features. The logic for grading rules and categories developed by the CTIA™ or the seller itself may be programmed into a system and method consistent with this disclosure, either as an internal component or a combination of internal/external with an integration to an external system using application programming interfaces (APIs) or other transfer method known to those of ordinary skill in the art. The results may be appended to the device profile for consideration of final disposition.

Operational (special) services 222 for a mobile device may include diagnostics and data erasure. A diagnostics module may be provided to determine operational and functional defects. Mobile device components that may require diagnostics include those listed in Table 2, below. In some cases, repairs may be done during the receiving process. In others, the device may be dispositioned according to the type of defect or issue. A diagnostics module performs device and operating system-appropriate diagnostic tests to determine the source of device issues and to validate the functional operability of the device. Application programs, such as those provided by Blancco Technology Group. of Palo Alto, Calif. or Piceasoft Ltd of Finland, may be integrated with the system to perform device diagnostics. Integration may comprise a diagnostic application installed on the device and running the application to perform diagnostics. Alternatively, the system may accept diagnostic results provided by any third-party application, receiving the data through a communication method such as API or ETL. The receiving station may be further comprised of a technology repair station, which allows the receiving operator to attempt to make quick or minor repairs or part replacements before continuing the process. Minor or other pre-defined issues found during diagnostics may be added to the device profile to be taken in to account during final disposition.

TABLE 2

Examples of Diagnostic Tests for Mobile Devices

| TEST AREA | COMPONENT |
| --- | --- |
| AGPS | AGPS |
| Audio | Headset |
| | Headset Microphone |
| | Speaker |
| | Receiver |
| | Microphone |
| Battery | Battery Charging |
| | Temperature |
| Camera | Auto Focus |
| | Camera |
| | Camera (customized) |
| | Camera Flash |
| | Front Camera |
| | Front Camera (customized) |
| | Video |
| | Video (customized) |
| Communication | Live call |
| Connectivity | Bluetooth |
| | Carrier Signal |
| | Dual - Carrier Signal |
| | Wi-Fi |
| | NFC |
| Device | Back Key |
| | Camera Key |
| | Home Key |

TABLE 2-continued

Examples of Diagnostic Tests for Mobile Devices

| TEST AREA | COMPONENT |
| --- | --- |
| | Menu Key |
| | Performance |
| | Recent App Key |
| | Screen Damage |
| | Screen Lock Key |
| | SD card |
| | SD Ram |
| | Search Key |
| | USB |
| | Vibration |
| | Volume Keys |
| | Silent Key |
| | LED |
| Display | LCD Backlight |
| | LCD Color |
| | Screen |
| | Touch |
| | Multi-Touch |
| Sensors | Proximity |
| | Barometer |
| | Fingerprint |
| | Light |
| | Compass |
| | Accelerometer |

Another operational service 222 required of mobile device returns is data erasure. In a preferred embodiment, a mobile device is connected to an erasure port and erased. A mobile device must be cleared of all data. Devices that cannot be erased must be dispositioned as salvage, labeled as such, and conveyed to a salvage bucket. Devices that are cleared continue to be processed to receipt and disposition. Alternatively, as with diagnostics, data erasure may be performed outside of the system and method described herein with results being provided from the external system via API or ETL or another data communications method. Results of the diagnostics 222 and data erasure 222 processes are appended to the device profile to be evaluated for final, optimal value determination.

Optimal Value Determination

Mobile devices that have passed preliminary dispositioning by gateway rules are finally dispositioned by evaluating all pertinent item profile data along with market data to determine the optimum value disposition path. Optimum value of products such as are disclosed here may be determined by the properties of the item (profile attributes), and its market price/demand, vendor availability and cost profiles.

An efficient supply chain may involve the free sharing of information among supply chain stakeholders. Through collaborative planning, forecasting and replenishment (CFAR), the sharing of information and coordination of decision-making strategies can create a competitive advantage and higher profits than can be achieved by each stakeholder acting alone. However, trust issues between trading partners and lack of appropriate information technology systems often prevent the realization of those benefits. In the absence of full information sharing, supply chain firms might apply their data to traditional forecasting methods, such as naïve forecasting, moving average, linear regression and time series forecasting models, or machine learning approaches such as Neural Networks, Recurrent Neural Networks and Support Vector Machines, to name a few.

Figure 6:
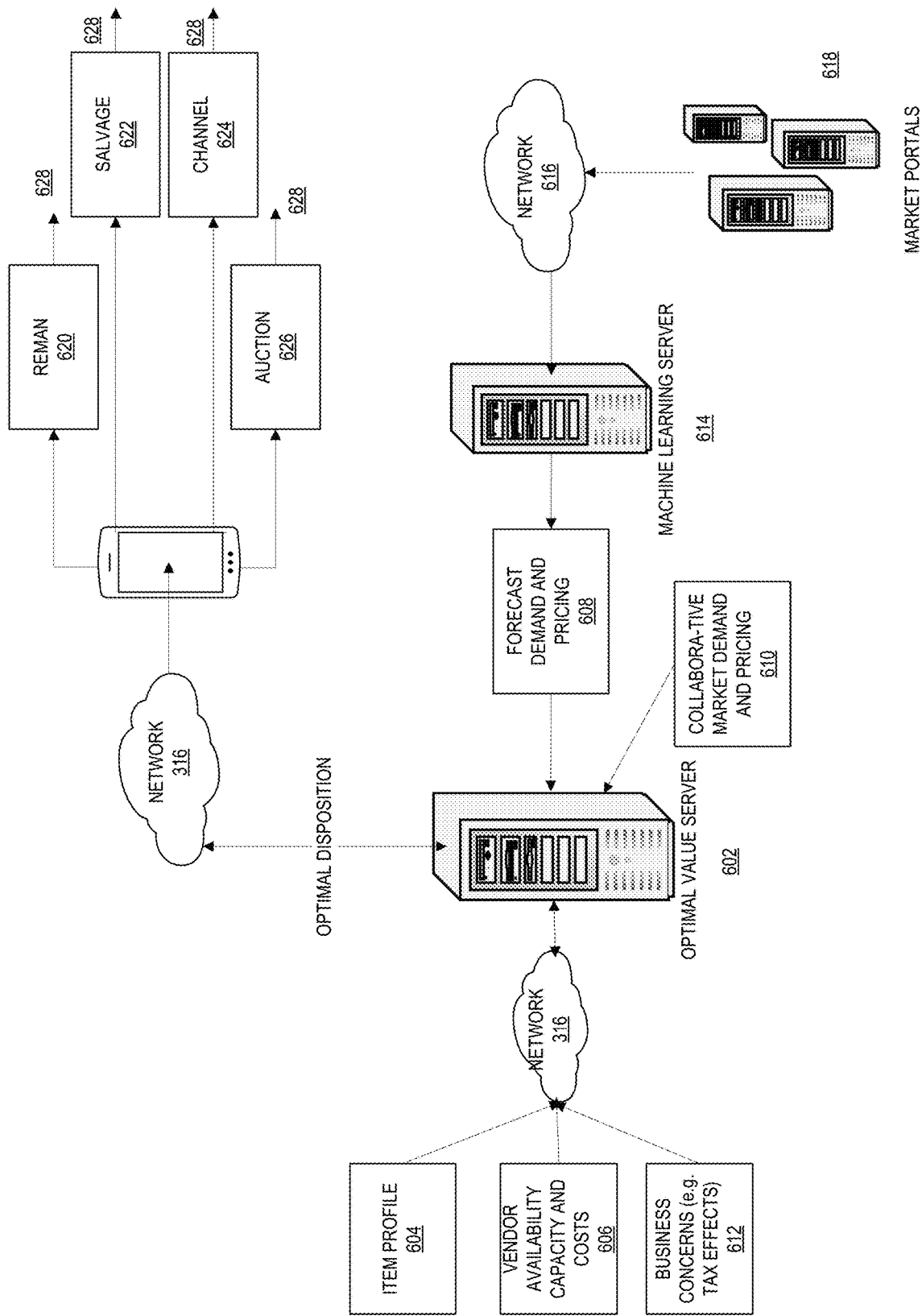
FIG. 6 illustrates an exemplary sub-system for determining the optimal value of an item using a preferred embodiment of the disclosed system and method.

FIG. 6 illustrates an optimal value determination system and method consistent with this disclosure and exemplary embodiment. The optimal disposition of a product depends on both the reverse and forward supply chain available for a product. Mobile devices may take advantage of secondary markets, so the optimal disposition may be to get the highest value accounting for all inputs. Exemplary optimal disposition categories of a mobile device may be defined as channel, remanufacture, refurbish, auction or salvage, or another category set that meets the needs of the device and markets under evaluation. There may be multiple vendors for each path, each with their own demand and pricing forecast.

Referring again to FIG. 6, an optimal value server 602 considers at least the data stored in the item profile 604, vendor capability and costing 606, and forecast demand and pricing for secondary markets 608, 610. Additional elements and business concerns, such as tax effects, 612 may be considered as well. Each server and system illustrated in FIG. 6 includes a computing device architecture as described in FIG. 3 for computing device 304. In particular, servers and systems 602, 604, 606, 608, 610, 612, 614 and 618 contributing or consuming data, each are comprised of communication device 306, processing device 308, and memory 310 with data storage 312 and modules and applications 314 comprised of computer-executable instructions which when executed by the processing device perform their functions and communicate the required data between systems.

As was described above, the disclosed system interaction could be implemented within a networked environment (e.g. the Internet, a wide area network (WAN), a local area network (LAN), a virtual private network (VPN), etc), a cloud computing environment, or a standalone computing system. Communications throughout the network can occur via any combination of various types of communication links or connection using wired or wireless transmission methods. Integration layers 228 provide communications between systems and services. Communications I/O application programming interfaces (API) may be SOAP, REST or other API services. When provisioned as a cloud-based Software-as-a-Service offering, the system may use cloud-based administration and control features 230 and a security layer 232.

To determine forecast demand and pricing, a machine learning server 614 may connect via a network 616, such as the internet, to market portals 618 providing details related to secondary market conditions for various markets and collect market data for items, typically identified by product number (SKU), make and model. In addition to forecasting data, vendor capability and costing data may also be available via a market portal 618. Data may be collected via API or other data communication method. In some embodiments, auction pricing and volume may be available for particular auction vendors accessible by network 316. Auction, and other market, vendors may represent markets in in China, the US and India, for example, or sub-markets within those markets. A machine learning server 614, comprising history for these attributes over time, may collect periodic data from the markets in order to train its model to determine the forecast demand and pricing expected at the time, and over a particular planning horizon. In addition to forecast demand and pricing 608 discoverable from machine learning, a collaborative supply chain 610 may share information and coordination of decision-making strategies in order to increase profits. One or both of these methods, or alternative methods, may be used to determine demand and pricing for an item for a particular dispositional category.

In order for a device to take a dispositional path, there must be demand for that device in the dispositional category and, in some cases, a vendor or supplier should be available to process (e.g. remanufacture, refurbish, auction, etc) the particular device. For example, if a mobile device requires replacing parts that couldn't be replaced during the receiving process and is eligible for remanufacturing (partially dependent on demand and on the item profile), and the value calculated for the item indicates remanufacturing as the optimal disposition, the device may go to a remanufacturing vendor who can perform that replacement. If there is no remanufacturing vendor or if the remanufacturing vendor has no capacity left to do the replacement within the forecast period, another vendor must be found or the dispositional path changed. If a device is eligible for remanufacturing, and there is a vendor available, but the cost to remanufacture makes an alternative dispositional path a better value, the alternative path may be taken. Similarly, if the device is remanufacturing eligible, but auction prices and demand in a Chinese market are higher than the remanufacturing value, regardless of whether a replacement part is made, the item may go directly to auction in the Chinese market rather than remanufacturing in the US. Using the data collected in the item profile, data concerning vendor capabilities and costing, business concerns and forecast demand and pricing, the optimal value determination is made for a particular mobile device. Mobile device disposition categories may be remanufacture 620, salvage 622, channel (such as insurance channel demand) 624 and auction 626. Each dispositional path may have multiple vendors and therefore, multiple shipping end points 628. The determination is completed in real-time as the mobile device lands at the final disposition station. The device is labeled with status and disposition information and conveyed to the final disposition shipping end point location for shipping.

Figure 7:
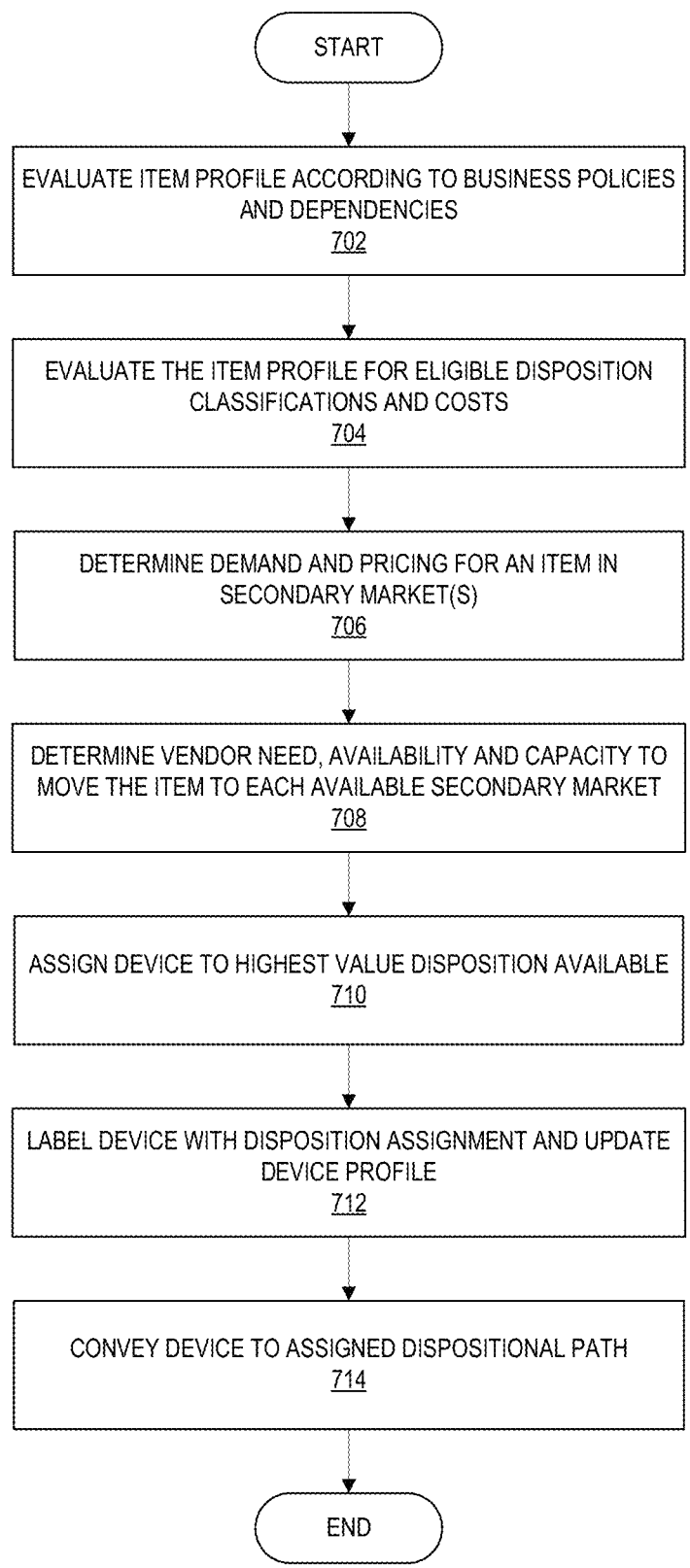
FIG. 7 illustrates a method performed by a system consistent with that of FIG. 6 in order to provide an optimal disposition of each evaluated device

FIG. 7 illustrates an exemplary method performed by a system consistent with that of FIG. 6 in order to provide an optimal disposition of each evaluated device based on both quantitative and qualitative measures. Each item profile may be evaluated according to business policies and dependencies 702 and may be dispositioned accordingly. Items may then be evaluated for eligible disposition classification and costs to reach the classification 704. Disposition category demand and pricing forecast for the device in secondary markets is determined 706. Vendor requirements, availability and capacity for the item (by SKU, make and model or similar identifier) may be determined 708. Devices are assigned to the dispositional category and vendor with the highest value to the seller, unless a business policy or dependency is of primary concern 710. The device is labeled with the disposition assignment and the device profile is updated with disposition data 712. The device is conveyed to the assigned bucket for shipment to the optimal endpoint vendor, warehouse, or market. 714.

The system and method disclosed herein comprises a computing device and various hardware components and subsystems. A computing device may also be referred to as a computer or server. Software applications, comprised of computer-executable instructions stored in computer-usable or computer-readable, non-transitory memory or non-transitory secondary storage for execution by a processor are operatively configured to perform the operations as described in the various embodiments. Any suitable computer-usable or computer-readable medium may be utilized. For example, and not limitation, the computer-usable or computer-readable medium may be an electronic, magnetic, optical, electromagnetic, infrared or semiconductor system, apparatus or device. The software applications may correspond with a single module or any number of modules. Modules of a computer system may be made from hardware, software, or a combination of the two. Generally, software modules are program code or instructions for controlling a computer processor to perform a particular method to implement the features or operations of the system. The modules may also be implemented using program products or a combination of software and specialized hardware components. In addition, the modules may be executed on multiple processors for processing a large number of transactions, if necessary or desired.

Although the computer, computing device or server has been described with various components, it should be noted that such a computer, computing device or server can contain additional or different components and configurations. In addition, although aspects of an implementation consistent with the system disclosed are described as being stored in memory, these aspects can also be stored on or read from other types of computer program products or computer-readable media, such as secondary storage devices, including hard disks, floppy disks, or CD-ROM; a non-transitory carrier wave from the Internet or other network; or other forms of RAM or ROM. Furthermore, it should be recognized that computational resources can be distributed, and computing devices can be client or server computers. Client computers and devices (e.g.) are those used by end users to access information from a server over a network, such as the Internet or a local area network. These devices can be a desktop or laptop computer, a standalone desktop, or any other type of computing device. Servers are understood to be those computing devices that provide services to other machines, and can be (but are not required to be) dedicated to hosting applications or content to be accessed by any number of client computers. Operations may be performed from a single computing device or distributed across geographically or logically diverse locations.

Communications between subsystems may be driven by computing device executable code by some type of interface, such as ethernet, Bluetooth, USB, or other connection. Remote access by customers or users may be provided by web services or networks. A computing device may transmit network-based services requests to external systems networks via external networks. In various embodiments, external networks may encompass any suitable combination of networking hardware and protocols necessary to establish network-based communications between clients and service provider network. For example, a network may generally comprise various telecommunications networks and service providers that collectively implement the Internet. A network may also include private networks such as local area networks (LANs) or wide area networks (WANs) as well as public or private wireless networks. For example, both a given client and service provider network may be provisioned within enterprises having their own internal networks. In such an embodiment, a network may include the hardware (e.g., modems, routers, switches, load balancers, proxy servers, etc.) and software (e.g., protocol stacks, accounting software, firewall/security software, etc.) necessary to establish a link between a client and the Internet as well as between the Internet and a service provider network. It is noted that in some embodiments, clients may communicate with server provider network using a private network rather than the public Internet.

It is to be understood that the above description is intended to be illustrative, and not restrictive. Many other implementation s will be apparent to those of skill in the art upon reading and understanding the above description. The scope of the disclosure should, therefore, be determined with reference to the appended claims, along with the full scope of equivalents to which such claims are entitled.

What is claimed is:

1. A system for determining the optimal disposition of a returned item, comprising:

a disposition engine comprising at least a processor, a memory, and computer-executable instructions stored in memory which when executed by the processor cause the processor to obtain data for an item as it is received and processed through the system, the system further comprising:

a receiving module operatively configured to collect data describing an item of a product wherein the receiving data is comprised of at least product attributes, item number, item identifier, item device status, and sales and return transactional data associated with the item, and creating an item profile from the receiving data;

an inspection and cosmetic grading process module comprising machine vision and a machine learning module to detect and measure defects in the cosmetic condition of the item and append an indicator of cosmetic condition onto the item profile;

a rules logic and repository module operatively configured to apply rules to the item profile to determine a first disposition of the item,which may be an intermediate or a final disposition of the item, where rules comprise business and operational requirements for the item attributes identified in the item profile;

an optimal disposition server comprising at least a processor, a memory, and computer-executable instructions stored in memory which when executed by the processor cause the processor to:

receive the item profile of an item which has not yet been assigned a final disposition;

receive forecast demand and pricing data for secondary markets;

receive business rules, vendor availability, cost profiles and available capacity data for secondary item processing; and determine, in real-time, the optimal final disposition of an item by applying business rule priorities and balancing the cost, pricing, and demand for the item; and assign the optimal disposition to the item, label the item with item-specificdata and dispositional path.

2. The optimal disposition server system of claim 1 further comprising:

a machine learning server comprising at least a processor, a memory, and computer-executable instructions stored in memory which when executedby the processor cause the processor to:

receive data related to at least one of (i) demand forecast for an item, (ii)market pricing for an item, or (iii) parts availability for an item from a plurality of external, secondary market, reverse and forward supply chain data sources;

train a set of predictive models for determining at least one of (i) demand forecast for an item, (ii) pricing forecast for an item, or (iii) parts availability for items requiring repair;

communicate model results to the optimal disposition server wherein the optimal disposition server uses the results as input to determine the optimal disposition of an item.

3. The system of claim 2 wherein the optimal disposition server machine learning models are of the type Neural Networks, Recurrent Neural Networks and Support Vector Machines.

4. The system of claim 2 wherein the machine learning server is operatively connected by networks to global auction market portals and the data received at the machine learning server comprises data related to demand and pricing in auctions in various markets including global markets.

5. The system of claim 1 wherein the inspection and cosmetic grading process module further comprises a machine vision system and a trained machine learning algorithm to detect and measure defects in the item's physical condition and to to provide a cosmetic grade for the item.

6. A method for intelligent disposition of returned assets, the method comprising:
   determining, by a computing device processor, inventory and transactional item attributes of an item;
   determining, by a computer device processor, the operational and functional status of the item;
   determining, by a computerized device processor, the cosmetic condition of the item, wherein the computerized device processor includes an image processing module and machine learning module capable of locating defects and measuring the three-dimensional aspects of each defect and assigning a condition grade to the item;
   creating a data record for the item by a computer device processor, the data record comprising at least the inventory item attributes of the item, the operational and functional status of the item, and the cosmetic condition of the item;
   applying business rule logic to the data record by a computer device processor, to determine disposition for the item where the disposition may be a first or afinal disposition;
   determining, by a computer device processor and a machine learning server, forecast item demand and pricing for secondary markets;
   determining, by computer device processor and communication vendor availability and capacity and cost to reach eligibility for optimal disposition;
   determining available dispositional classifications for items, by a computer deviceprocessor, wherein available classifications are based on the data record vendor availability and capacity cost and forecast demand for the item;
   determining the optimal dispositional classification for each item, wherein the available dispositional path and vendor of greatest value is chosen; and
   labeling and directing the item to the appropriate bin for shipping.

7. The method for intelligent disposition of returned assets of claim 6 wherein the vendor availability and capacity and cost and forecast demand for an item used in the determining available dispositional classifications step are determined from data extracted from external vendor and supplier systems who may be available to remanufacture or refurbish a particular device.

8. The system for determining the optimal disposition of a returned item of claim 1, wherein the machine learning server component of the optimal value server is further comprised of network access to external auction market portals, wherein the machine learning server may access data with which to forecast demand and pricing in these secondary markets, the machine learning server using a trained machine learning algorithm to create forecast for demand and pricing.

9. The system for determining the optimal disposition of a returned item of claim 1 wherein the optimal value server is further comprised of an operational services module operatively configured to determine the operational condition of an item and append operational condition status onto the item profile.

10. The system for determining the optimal disposition of a returned item of claim 1 wherein the optimal value server is further comprised of network access to external vendor capability and cost information, where a vendor may provide secondary processing to improve the optimal disposition of the item.

11. The system for determining the optimal disposition of a returned item of claim 1 wherein the optimal value server is further comprised of network access to a business concerns and tax effects module wherein tax effects of optimal disposition transactions may be considered in an optimal disposition determination.

* * * * *